July 4, 1950     H. SCHEID     2,513,430
PICKUP MECHANISM

Filed July 16, 1945

INVENTOR.
HERMAN SCHEID
ATTORNEYS.

Patented July 4, 1950

2,513,430

UNITED STATES PATENT OFFICE 2,513,430

PICKUP MECHANISM

Herman Scheid, Keenesburg, Colo., assignor to Deere & Company, Moline, Ill., a corporation of Illinois Application July 16, 1945, Serial No. 605,226

2 Claims. (Cl. 56—364)

The present invention relates generally to pick-up mechanism of the type which is usually associated with a harvester, for picking up windrowed crops in the field, and is in the nature of an improvement in the pick-up mechanism disclosed and claimed in U. S. Patent 2,253,797, granted August 26, 1941, to Melroe. This patent shows a pick-up device of the belt type, which comprises a pair of front and rear transverse rollers, over which is trained a flexible endless belt having a plurality of spring fingers attached thereto, for the purpose of engaging and lifting crops from the ground to the inclined surface of the belt.

Under certain crop conditions, when harvesting a light fluffy windrow, as frequently experienced when picking up edible beans, the spring fingers of the pick-up device tended to push the crops forwardly until a large bunch was accumulated, before they were able to pick the material up and convey it to the harvester platform, which frequently resulted in clogging the threshing cylinder.

The principal object of my invention, therefore, relates to the provision of means by which a light fluffy windrow of crops can be positively picked up and conveyed continuously to the platform of the harvester. In the accomplishment of this object, I have found that the spring fingers of the belt type pick-up device will raise the windrow continuously up to the pick-up belt if some means is provided for holding the windrow down against the ground to prevent it from being pushed or kicked forwardly by the pick-up fingers. Therefore, it is a further object of my invention to provide means for pressing or holding the windrow against the ground and against the belt of the pick-up device while the windrow is being raised off the ground and conveyed rearwardly by the belt.

Figure 1:
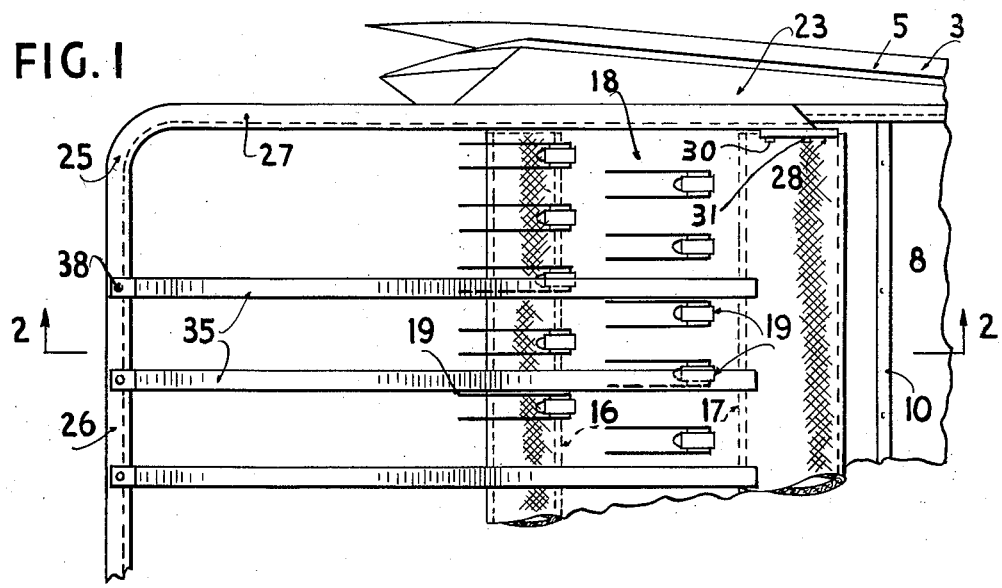
Figure 2:
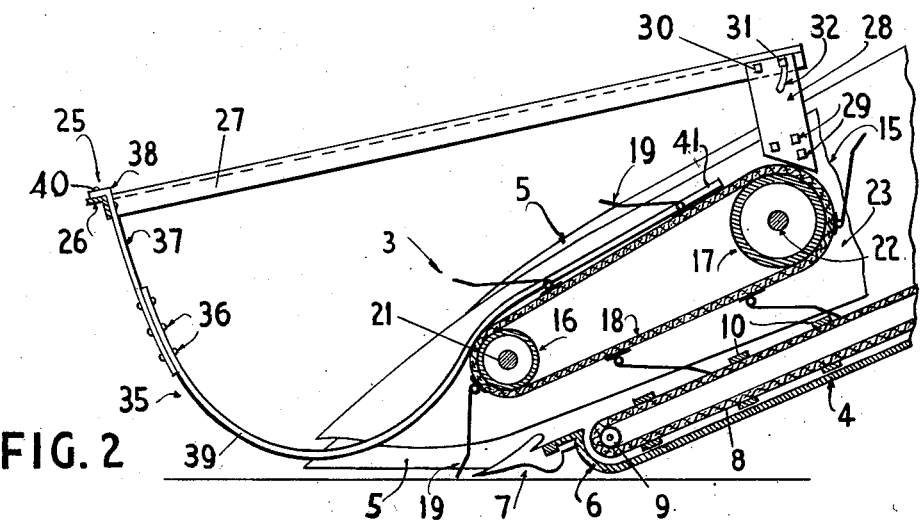

These and other objects and advantages of my invention will be apparent to those skilled in the art after a consideration of the following description, in which reference is had to the drawings appended hereto, in which Figure 1 is a fragmentary top plan view of a pick-up device mounted on the forward end of a harvester platform, and embodying the principles of the present invention; and Figure 2 is a sectional elevational view taken along a longitudinal vertical plane 2—2 in Figure 1.

Referring now to the drawings, the combine platform is indicated in its entirety by reference numeral 3 and is a conventional harvester platform comprising a transversely disposed metal pan 4 inclined upwardly and rearwardly and having a pair of laterally spaced generally vertical side walls 5, only one of which is shown in the drawings. The lower end of the grain pan is curved upwardly at 6 and carries the usual cutter bar 7, which of course is not used in a harvesting operation involving the present invention. A conventional endless canvas conveyor 8 is trained over a lower roller 9 immediately behind the cutter bar, and has a plurality of transverse slats 10 for moving the crops rearwardly on the harvester platform.

The pick-up device is indicated by reference numeral 15 and comprises a pair of front and rear transverse rollers 16, 17, over which is trained a flexible endless belt 18, to which is attached a plurality of resilient crop engageable fingers 19, the details of which are disclosed and claimed in Patent 2,364,303 granted to Martin, December 5, 1944. Each of the rollers 16, 17 is mounted on supporting shafts 21, 22, which are journaled at opposite ends thereof, respectively, in a pair of end shields 23, which are mounted by any suitable means on the forward ends of the platform side walls 5, respectively. The upper surface of the belt constitutes one form of means for directing crops rearwardly.

Mounted on the pick-up device is a windrow compressor, indicated in its entirety by reference numeral 25 and comprising a transverse frame bar 26 disposed forwardly of the front roller 16 and above the latter. The frame bar 26 is carried on a pair of laterally spaced forwardly and downwardly inclined side frame members 27, only one of which is shown in the drawings, which are supported at their rear ends on supporting plates 28 fixed by bolts 29 to the end shield 23 of the pick-up device, respectively. Each of the arms 27 is pivotally connected to the plate 28 by means of a pivot bolt 30, providing for vertical shifting movement of the transverse supporting bar 26, the frame being secured in adjusted position by a securing bolt 31 which extends through a curved slot 32 in the plate 28 and through an aligned aperture in the side frame member 27.

Mounted on the transverse frame member 26 is a plurality of laterally spaced, longitudinally extending, resilient U-shaped compressor bars 35, each formed in two sections riveted together at 36 and including a comparatively stiff upper section 37 having its upper end 38 turned at right angles and bolted, riveted or otherwise secured, as at 40, on top of the supporting bar 26. A flexible lower section 39 of each of the compressor bars 35 curves downwardly near the ground in front of the front belt roller 16. The compressor bar 35 then curves upwardly and then rearwardly over the forward end of the pick-up device 15 and lies on top of the belt 18, extending over the latter and substantially to the rear roller 17, as at 41. The rear ends of the compressor bars 39 press lightly against the crops on the top of the pick-up belt 18 and slide on the latter as it travels around the rollers 16, 17.

During operation in the field, the harvester moves forwardly, or to the left, as viewed in the drawings, the lower curved portion of the compressor bars 39 sliding over the crops in the windrow, and gently pressing them against the ground ahead of the front roller 16. The pick-up belt 18 travels in a clockwise direction, as viewed in Figure 2, carrying the spring fingers forwardly over the cutter bar 7 to engage the windrow. As the spring fingers 19 move upwardly around the front roller 16, raising the windrow, the crops are prevented from being merely pushed forwardly by the spring fingers 19, by virtue of the fact that the upwardly curving portion of the compressor bars 39 coacts with the spring fingers to hold the windrow against the front roller and to gently press it down upon the top of the belt 18 as the latter moves rearwardly. The windrow is discharged over the rear roller 17 to the top of the canvas conveyor 8, which conveys the crops rearwardly.

I claim:

1. For use with a pick-up device including a pair of front and rear transversely disposed rollers about which is trained a rearwardly moving, flexible endless belt having a plurality of crop-engaging fingers thereon: a windrow compressor comprising a support including a member positionable transversely across and ahead of the pick-up device; and a plurality of laterally spaced, longitudinally extending resilient U-shaped compressor bars, each fixed adjacent one end portion to said frame bar and free at the opposite end, said bars being curved downwardly near the ground in front of the front roller and below the upper surface of the belt of the pick-up device for pressing light fluffy crops against the ground in the path of the spring fingers, then curving upwardly and rearwardly to extend over the front roller, the rear portions of said bars being arranged to rest on the belt of the pick-up device, whereby said crops will be pressed against the front of the front roller as they are raised by the fingers.

2. For use with a pick-up device having a fore and aft extending frame on which is carried a pick-up element having a generally rearwardly movable portion for directing crops from front to rear of the device: a support connectible to the frame to extend ahead of the pick-up element and having a member positionable transversely of the pick-up frame and at a level above the ground in front of the pick-up element; and windrow-compressor means comprising a plurality of resilient bars laterally spaced apart on and secured to the transverse member, each being shaped and arranged to extend downwardly from said member to a point near the ground in front of the pick-up element and to continue thence upwardly and then rearwardly over and in close proximity to the movable crop-directing portion of the pick-up element.

HERMAN SCHEID.

REFERENCES CITED

The following references are of record in the file of this patent:

UNITED STATES PATENTS

| Number | Name | Date |
|---|---|---|
| 795,186 | Arter et al. | July 18, 1905 |
| 1,815,327 | Raney et al. | July 21, 1931 |
| 2,363,888 | Martin | Nov. 28, 1944 |
| 2,391,763 | Anderson | Dec. 25, 1945 |